March 16, 1926.                                                                                  1,576,793
L. SADLER
REAR VISION MIRROR
Filed April 25, 1925

INVENTOR
LUTHER SADLER
BY
HIS ATTORNEYS

Patented Mar. 16, 1926.

1,576,793

UNITED STATES PATENT OFFICE.

LUTHER SADLER, OF LOS ANGELES, CALIFORNIA.

REAR-VISION MIRROR.

Application filed April 25, 1925. Serial No. 25,779.

*To all whom it may concern:*

Be it known that I, LUTHER SADLER, a citizen of the United States, and a resident of Los Angeles, county of Los Angeles, State of California, have invented a new and useful Rear-Vision Mirror, of which the following is a specification.

My invention relates to rear vision mirrors, and especially to mirrors mounted on vehicles to enable the operator to see to the rear.

An object of my invention is to provide a mirror that will enable the operator of the vehicle on which it is installed to see immediately below and to the rear of the vehicle.

Another object of my invention is to provide means for moving the mirror into inoperative protected position when its use is not desired.

Other objects of the invention together with the foregoing will be set forth in the following description of the preferred form of my invention which is illustrated in the drawings accompanying and forming part of the specification. It is to be understood that I do not limit myself to the showing made by the said description and drawings, as I may adopt variations of my preferred form within the scope of my invention as set forth in the claims.

Broadly speaking, my invention preferably comprises a mirror mounted below an opening in the floor of a vehicle in such a position that the vehicle operator by looking through the opening at the mirror can see to the rear.

My invention, while adaptable to vehicles generally, is particularly useful in connection with automobile trucks. Very often, the load on a truck occupies such a large space behind the operator's seat that the operator is unable to see to the rear of the vehicle and is hindered in driving, particularly in backing. Blind maneuvering of a truck, for instance when it is being backed into position for unloading, is awkward and dangerous as the driver has no knowledge of obstacles or persons behind the truck. Mirrors placed on arms projecting from the side of the driver's compartment to be of any service must project so far that they are liable to be struck and damaged. At best they can give vision only at a great distance behind the truck and are incapable of revealing what is immediately in the rear of the vehicle.

Figure 2:
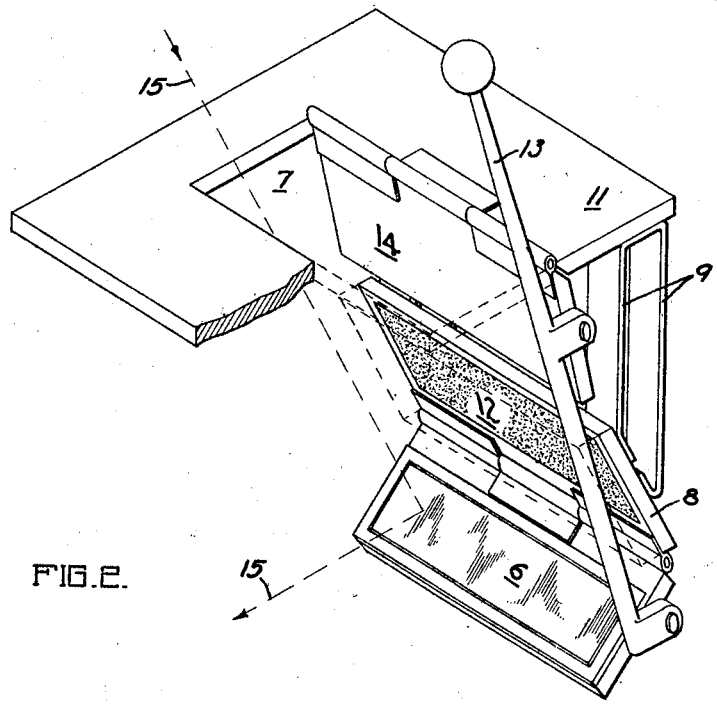
Fig. 2 is a perspective view of my mirror attached to the floor of a vehicle, portions being broken away, the parts of the mirror mounting being shown in operative position in full lines and in inoperative position in broken lines.

My invention comprises a mirror 6 preferably made of a polished sheet of metal or a silvered glass and which is suitably mounted below an opening 7 in the floor of the driver's compartment. In the form of my device shown in the drawings, a plate or protector 8 is attached by means of brackets 9 to a suitable portion of the vehicle, such as the frame or floor 11. The protector is a substantially rigid plate which is covered on most of one side by a strip of felt 12 or comparable material. The mirror 6 is hinged to the lower edge of the protector and may be swung from inoperative to operative position, and vice versa by means of an adjusting rod 13 pivoted to one side of the mirror and extending into the driver's compartment. The adjusting rod is also pivoted to a trap door 14 or closure which is hinged to the floor of the vehicle at the edge of the opening. The closure and mirror are so hinged and pivoted, that when the adjusting rod is pushed down the closure drops and the mirror is in its open or operative position, as denoted by the full lines in the drawings. When the adjusting rod is pulled up, the closure covers the opening and the mirror is moved to inoperative position, lying against the protector, as shown by the dotted lines in Fig. 2.

Figure 1:
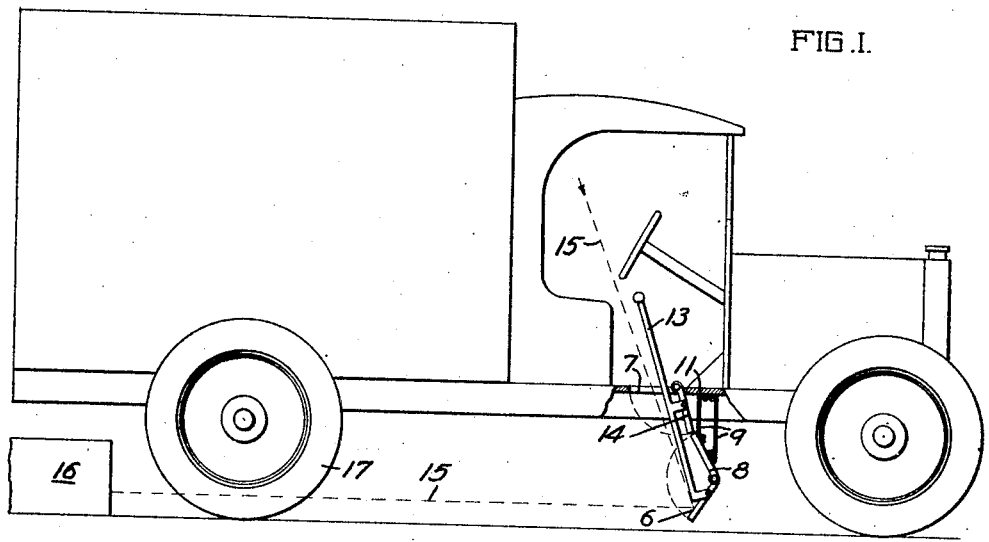
Figure 1 is an elevation of an automobile truck equipped with my rear vision mirror, portions being broken away to show the mirror in operative position.

During the normal operation of the vehicle, the adjusting rod is pulled up, placing the closure and mirror in closed position. When the operator wishes to look to the rear of the vehicle, he pushes down on the adjusting rod, thereby swinging the closure out of the opening in the floor and moving the mirror away from the protector to a position that will reflect his line of sight rearwardly. The dotted line 15 shows a typical line of sight which, in Fig. 1, reveals an obstruction 16 to the driver. The angle of the mirror can be varied to suit the driver by changing the position of the adjusting rod, and the hinges and pivots offer enough frictional resistance to retain the mirror in adjusted position. The mirror and closure are returned to their closed position for normal driving by pulling up the adjusting rod.

In its closed position, the mirror lies against the felt or similar material on the protector plate which keeps the mirror free from dirt and dust, while the protector plate itself fends off stones and pebbles picked up and thrown by the wheels.

It will be appreciated that the mirror of my invention provides convenient means for seeing what is immediately at the rear of the vehicle to which it is attached, and which can also be used to reveal portions of the running gear of the vehicle, such as the rear tires 17.

I claim:

1. The combination with a vehicle having an opening in the floor thereof, of an adjustable mirror mounted below the floor and visible through said opening, said mirror being movable from operative to inoperative position and a protecting plate adjacent which the mirror lies when in inoperative position.

2. The combination with a vehicle having an opening in the floor thereof, of an adjustable mirror mounted below and visible through said opening, an adjusting rod attached to said mirror and extending above the floor of said vehicle, and a closure for said opening actuated by said adjusting rod.

3. The combination with a vehicle having an opening in the floor thereof, of a door movable to open and close the opening, a rear view mirror mounted below the floor and visible through the opening when open, said mirror being movable from operative to inoperative position and means connecting the door and the mirror whereby the door and the mirror are moved together to simultaneously open the door and place the mirror in operative position and vice versa.

In testimony whereof, I have hereunto set my hand.

LUTHER SADLER.